United States Patent [19]

Warr et al.

[11] Patent Number: 4,790,074

[45] Date of Patent: Dec. 13, 1988

[54] APPARATUS FOR TESTING RACK TEETH

[75] Inventors: Roland A. Warr, Bedfordshire; Rogers, Peter R., Gwent, both of Great Britain

[73] Assignee: TRW Cam Gears Ltd., Hertfordshire, United Kingdom

[21] Appl. No.: 825,276

[22] Filed: Feb. 3, 1986

[30] Foreign Application Priority Data

Feb. 4, 1985 [GB] United Kingdom ............... 8502736

[51] Int. Cl.$^4$ .............................................. G01B 5/00
[52] U.S. Cl. .......................... 33/199 R; 33/179.5 R; 33/600
[58] Field of Search ................. 33/179.5 R, 179.5 B, 33/179.5 C, 179.5 E, 180 AT, 181 AT, 199 R, 199 B; 73/162

[56] References Cited

U.S. PATENT DOCUMENTS

| | | | |
|---|---|---|---|
| 2,350,788 | 6/1944 | Martin | 33/179.5 B |
| 2,369,477 | 2/1945 | Martin | 33/179.5 B |
| 2,669,028 | 2/1954 | La Femina | 33/179.5 B |
| 2,819,532 | 1/1958 | Praeg | 33/179.5 B |
| 3,694,923 | 10/1972 | Heiberger | 33/179.5 B |

FOREIGN PATENT DOCUMENTS 644959  10/1950  United Kingdom ........... 33/179.5 B

OTHER PUBLICATIONS

"New Principle Employed in Gear Checking Machine," *Machine Design*, Jun. 1948, pp. 128-130.

*Primary Examiner*—William A. Cuchlinski, Jr.
*Assistant Examiner*—Patrick R. Scanlon
*Attorney, Agent, or Firm*—Tarolli, Sundheim & Covell

[57] ABSTRACT

An apparatus tests rack teeth of a rack member for a rack and pinion vehicle steering gear. The apparatus comprises a support for mounting the rack member for longitudinal displacement and a helically toothed test pinion member having an axis. A carriage mounts the test pinion member for rotation about its axis and in driving engagement with the rack member. A resilient biasing spring urges the test pinion member into engagement with the rack member and provides a predetermined lateral spacing between the longitudinal axis of the rack member and the axis of the test pinion member. A screw adjusts the biasing force of the resilient biasing spring at the predetermined lateral spacing. A drive effects displacement of one of the rack and test pinion members to impart displacement to the other of the rack and test pinion members. A first sensing device senses the displacement of one of the rack and test pinion members which results from successive and predetermined unit displacement of the other of the rack and test pinion members. A second sensing device senses a variation from the predetermined lateral spacing between the axes of the rack and test pinion members which is caused by the unit displacements.

11 Claims, 1 Drawing Sheet

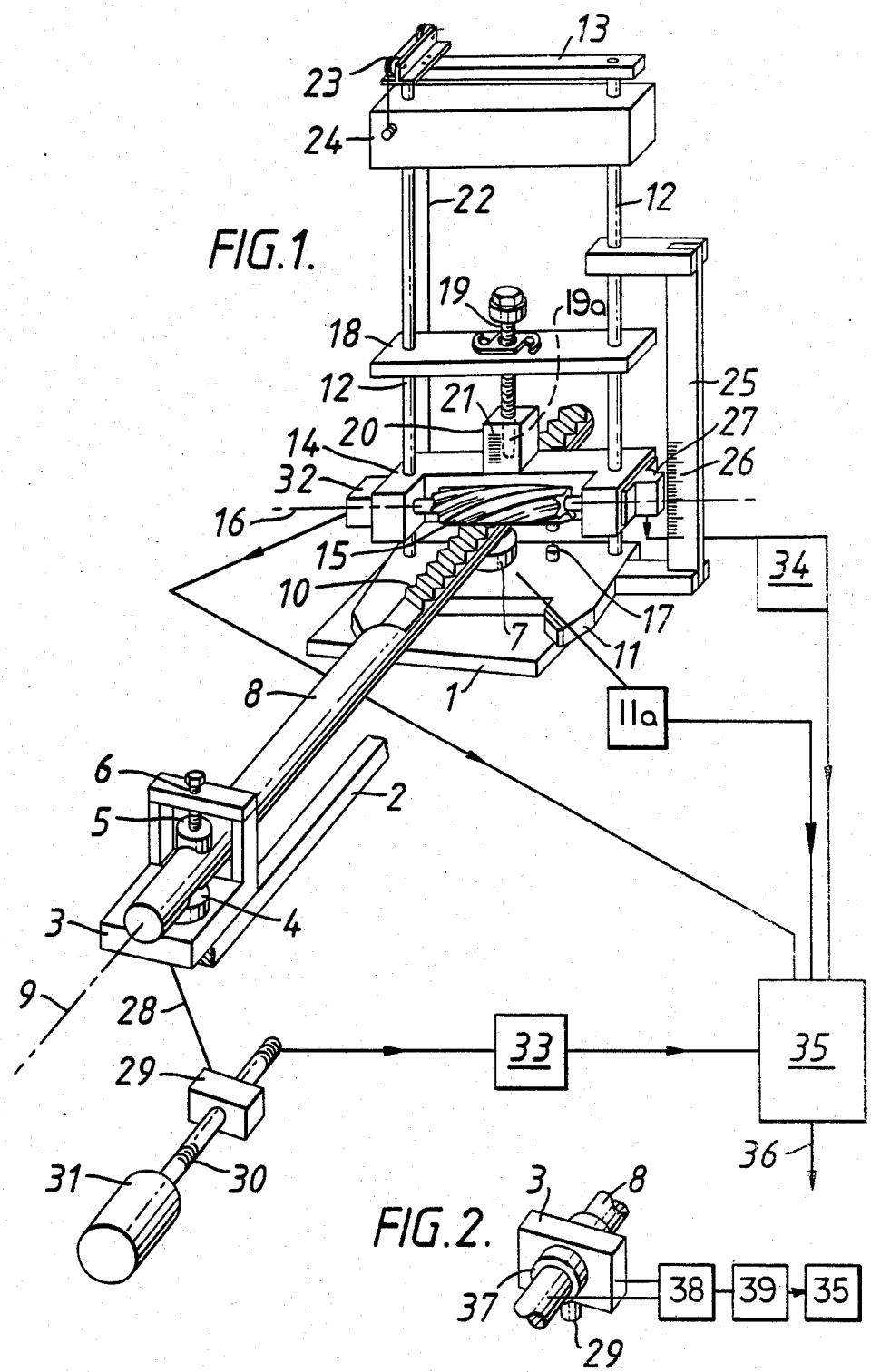

APPARATUS FOR TESTING RACK TEETH

TECHNICAL FIELD AND BACKGROUND ART

This invention relates to apparatus for testing rack teeth of a rack member which may be intended for use in a rack and pinion vehicle steering gear.

Conventionally, rack and pinion steering gears incorporate a rack member, the teeth of which are of constant pitch and wherein each tooth has the same uniform cross-sectional profile so that when the rack member is driven by rotation of a pinion with which it engages, a substantially constant gear ratio is provided for that drive between the pinion and the rack member. With such a rack member the teeth are easily formed by a conventional broaching operation. Since the teeth each have a uniform cross sectional profile it is a simple matter to check or test the accuracy of the finished rack teeth by use of shadow graph techniques whereby an appropriate comparison can be made between the profile of the rack teeth and a master profile of the desired tooth form from which the acceptability of the rack teeth under test can be determined.

There is increasingly a demand for vehicle steering systems having so-called variable ratio rack and pinion gears. Gears of this kind incorporate a rack member having a longitudinal axis and comprising a longitudinal array of laterally extending rack teeth, the rack teeth (which may, and usually will, extend laterally at an acute angle with respect to the said axis) being intended for driving engagement with a helically toothed pinion and comprising teeth of varying pitch having a cross sectional profile which is non-uniform over the lateral extent of those respective teeth to provide a variation in gear ratio between a said pinion and the rack member when said driving engagement is effected; such a variable ratio rack member will hereinafter be referred to as "of the type specified". Examples of rack members of the type specified are discussed in British Pat. Specifications Nos. 1,356,172 and 2,132,513, and, because of the non-uniform cross sectional profile which the rack teeth have over their lateral extent, it is not possible to machine the final form of those teeth by conventional broaching techniques. Consequently a preferred method of forming the variable ratio rack teeth is by forging or pressing between dies. Furthermore, because of their non-uniform cross sectional profile as aforementioned, it is not possible to test or check the acceptability of the variable ratio rack teeth by the conventional shadow graph techniques. It is, of course, essential that the rack teeth of rack members of the type specified are tested to ensure that they are formed to the required accuracy and within the tolerance of acceptability for a steering gear of which they may be intended to form part and there is a requirement for an apparatus by which the acceptability of the rack teeth can readily and efficiently be determined it is an object of the present invention to satisfy this requirement.

STATEMENT OF INVENTION AND ADVANTAGES

According to the present invention there is provided apparatus for testing rack teeth of a rack member of the type specified which comprises a support for mounting the rack member to be capable of longitudinal displacement; a helically toothed test pinion having a pinion axis and mounted to be rotatable about its axis in a carriage for driving engagement with the rack teeth whereby said driving engagement results in rotational displacement of the pinion and longitudinal displacement of the rack member; biasing means for urging the test pinion into engagement with the rack teeth and to provide a predetermined spacing between the longitudinal axis of the rack member and the pinion axis; bias adjusting means for adjusting and determining a biasing force for said biasing means at said predetermined spacing; drive means by which said displacement of one of the rack member and pinion components is effected to impart displacement to the other of said components, and wherein sensing means is provided which senses:

(a) the said displacement of one of the rack member and the pinion components which results from successive and predetermined unit displacement of the other of said components, and (b) any variation which results from the predetermined spacing between the axes of the rack member and the pinion during said unit displacements, said sensing means providing an output from said sensings from which output, characteristics of the rack member under test can be compared with standard characteristics acceptable for the rack member.

The sensings as mentioned above, which may be achieved by use of electrical or optical detectors (which latter may comprise transducers responsive to mechanical displacement), will result in an output co-relating the longitudinal displacement of the rack member to the rotational displacement of the test pinion from which the acceptability of the variation in gear ratio between the rack teeth and test pinion can be determined and also the acceptability of the general smoothness of the transmission which is effected between the rack teeth and the pinion. In addition, the output which results from sensing any variation in the spacing between the axis of the rack member and the test pinion (sometimes known as the variation in meshing centres) can be used to provide an indication of the acceptability of the rack tooth form. On the basis of the aforementioned sensings and the output therefrom it will be possible to determine, for example, if the profile of the rack teeth under test is unacceptable and that accordingly it may be necessary to change the dies from which those teeth were pressed. Although each of the aforementioned displacements and variations may be assessed individually, it is preferred that the respective signals which result therefrom are encoded, integrated and computed to provide an overall indication of the acceptability of the rack member; this computation will preferably be pre-programmed with standard characteristics (and the tolerance ranges for those characteristics) required of the rack teeth so that the output from the sensings are automatically compared with the standard characteristics and an indication given of the acceptability or otherwise of the rack member under test. The required computer programming, comparison techniques and read-out facility will be readily apparent to persons skilled in the relevant art and having an understanding of the present invention.

Preferably the biasing means comprises a compressible spring or other resilient means and the bias adjusting means comprises a screw adjustment for adjusting the biasing force of the spring or resilient means to the appropriate force with which the rack member will be urged into engagement with the test pinion - this force will usually be the same as that which would be applied to the rack member when incorporated in a vehicle steering gear so that the rack member under test is subjected to similar conditions of engagement with the pinion as those to which it will be subjected in practice. It is also preferred that the test pinion and the support for the rack member are capable of swivelling relative to each other so that the angle of the pinion axis with respect to the longitudinal axis of the rack member can be adjusted in setting up the rack member for driving engagement with the pinion. It will be appreciated that in a steering gear the pinion (which will have a form substantially identical to that of the test pinion) is mounted to engage with the rack teeth at a predetermined angle, usually an acute angle, with respect to the longitudinal axis of the rack member; this predetermined angle may however vary from one design of steering gear to another so the relative swivelling as mentioned above permits the apparatus to be adjusted as appropriate for the required characteristics between the pinion and the rack member under test. Usually there will be provided a locking means for securing the pinion with its axis at a predetermined angle with respect to the longitudinal axis of the rack member; however, as a further facility which may be provided by the apparatus, the test pinion may be permitted to swivel relative to the longitudinal axis of the rack member during driving engagement between those components and the sensing means can be arranged to sense any variation which results from the predetermined angle of the pinion axis with respect to the longitudinal axis of the rack member during the driving engagement and to provide an output of those sensings for comparison with the acceptable standard characteristics required of the rack member under test, particularly in assessing the rack tooth profile.

The drive means may be arranged to impart rotational displacement directly to the pinion and therethrough to longitudinally displace the rack member. It is preferred however that the drive means is arranged to displace the rack member longitudinally so that the test pinion is rotatably displaced in response to the longitudinal displacement of the rack member. This latter preference permits a convenient mounting for the rack member whereby the support can be carried on a slideway and coupled to a rotatably driven lead screw so that rotation of the lead screw longitudinally displaces the support through distances which can accurately be determined and sensed by the extent to which the lead screw is rotated and by knowing the pitch of the thread for that screw. Generally, and especially where a lead screw is employed as aforementioned, it will be simpler to determine what may be regarded as controlled but random steps of longitudinal displacement of the rack member than it will for similar steps of rotational or angular displacements of the test pinion and accordingly it is preferred that the sensing means is arranged to sense successive longitudinal displacements of the rack member which result from or result in respective and successive predetermined constant units (say one degree units) of rotation or angular displacement of the test pinion.

The rack member under test will usually be mounted in the support so that its rack teeth are retained in a predetermined plane with respect to the test pinion. In use of the rack member in a vehicle steering gear such member may be subjected to what is known as "rack roll" whereby the driving engagement between the rack and pinion causes the rack member to exhibit a rolling motion about its longitudinal axis. Accordingly it may be required to test the rack member in a manner whereby the "rack-roll" is assessed; with this in mind the support for mounting the rack member can include means whereby that member may exhibit a rolling motion about its longitudinal axis during its driving engagement with the pinion. Furthermore, the sensing means may be capable of sensing a rolling motion of the rack member and provide an output of these sensings for comparison with the acceptable standard characteristics required of the rack member under test.

DRAWINGS

One embodiment of an apparatus for testing the rack teeth of a rack member of the type specified and constructed in accordance with the present invention will now be described, by way of example only, with reference to the accompanying illustrative drawings, in which:

FIG. 1 diagrammatically shows a perspective view of the apparatus with a rack member mounted for testing and with the rack member restrained from rolling, and FIG. 2 shows a modification for the apparatus of FIG. 1 by which the rack member may be mounted to exhibit rolling during its driving engagement with the test pinion.

DETAILED DESCRIPTION OF DRAWINGS

The apparatus shown has a base plate 1 secured relative to a longitudinally extending slideway 2. Slidably mounted on the slideway 2 is a rack bar carriage 3 having opposed clamping blocks 4 and 5 (the latter of which is screw adjustable at 6). Carried by and secured relative to, the base plate 1 is a yoke 7.

A rack member of the type specified and in the form of a generally cylindrical rack bar 8 is clamped between the blocks 4 and 5 to extend longitudinally thereform and be seated on the yoke 7. The bar 8 has a longitudinal axis 9 and a longitudinal array of rack teeth 10 which extend laterally at an acute angle with respect to the axis 9. The teeth 10 are of varying pitch as, for example, in accordance with the disclosure in G.B. Specification No. 1,356,172. The yoke 7 is profiled to provide a scating for the side of the rack bar 8 remote from the rack teeth 10 and this yoke straddles the rack bar so that the latter is slidably displaceable longitudinally over it in response to displacement of the rack bar carriage 3 along the slideway 2.

Mounted on the base plate 1 to be capable of swivelling about the yoke 7 is a swivel plate 11. Secured to, and extending upwardly from the swivel plate 11 with the rack bar 8 disposed between them, are a pair of rods 12 which are secured together at their upper ends by a brace 13 to form a frame. Slidably mounted on the rods 12 is a pinion carriage 14. A cylindrical, helically toothed test pinion 15 of conventional form is mounted in the carriage 14 to be capable of rotation about the pinion axis 16. The pinion 15 is carried by the carriage 14 to engage with the rack teeth 10 in conventional manner and with the pinion located substantially oppositely to the yoke 7. It will be realised that the teeth of the pinion 15 will be of a form suitable for meshing engagement with the teeth 10 of the rack under test and, for the purpose of ensuring correct meshing engagement, the swivel plate 11 (and thereby the pinion carriage 14) can be rotated to adjust the pinion axis 16 with respect to the rack bar axis 9 to an appropriate angle of engagement; means such as a lock or stop 17 is provided for securing the swivel plate 11 relative to the base plate 1 in the desired angular relationship between the axes 9 and 16.

Carried by and secured relative to the rods 12 on the side of the carriage 14 remote from the rack bar 8 is a fixed plate 18. The plate 18 carries a screw adjustable rod 19 which reacts against a spring biasing component 19a within a housing 20 of the pinion carriage 14. The biasing component within the housing 20 reacts between the carriage 14 and the rod 19 (and therethrough against the plate 18) to urge the teeth of the test pinion 15 into engagement with the rack teeth 10. By screw adjustment of the threaded rod 19 relative to the plate 18 it will be apparent that the biasing force exerted through the spring component within the housing 20 and thereby the biasing force urging the pinion teeth into engagement with the rack teeth can be adjusted for a predetermined spacing between the rack bar axis 9 and the pinion axis 16. A scale 21 is provided on the pinion carriage 14 to give an indication of the biasing force which is applied to the test pinion. So that the scale 21 provides an accurate indication of the biasing force exerted by the spring component in urging the pinion and rack teeth into engagement, the pinion carriage 14 (together with the pinion 15 and other components which may be carried by the carriage 14) may be counterbalanced; this counterbalancing of the pinion carriage is optional and in the illustrated embodiment is provided by a cable 22 which extends over idler pulley wheels 23 on the brace 13 and connects the carriage 14 with a counterweight 24 slidably mounted on the rods 12.

Fixed between one of the rods 12 and the swivel plate 11 is a vertical scale bar 25 having a scale 26. The bar 25 extends parallel to the rods 12 and adjacent to the carriage 14 and the latter carries detecting means 27 (such as an optical detector) which scans the scale 26 and provides an output which is indicative of displacement between the carriage 14 and the scale 26.

Connected to the rack bar carriage 3, as indicated by the link 28, is a nut 29 of a lead screw 30. The lead screw 30 extends parallel to the rack bar axis 9 and is restrained from longitudinal displacement so that when rotated by an electric motor 31, the nut 29 is displaced along the lead screw and thereby the rack bar carriage 3 is displaced longitudinally along the slideway 2. During this latter displacement it will be apparent that the rack bar 8 is displaced longitudinally between the test pinion 15 and the yoke 7 so that the engagement between the rack and pinion teeth imparts rotation to the pinion 15 and it is during such longitudinal displacement of the rack bar that the rack teeth 10 are intended to be tested. For the purpose of this testing the test pinion 15 is coupled to an encoder unit 32 on the carriage 14; this unit 32 senses predetermined angular or rotational displacement of the pinion 15 (say 1° units of such rotational displacement) which result from longitudinal displacement of the rack bar 8. Similarly, the lead screw 30 is coupled to an encoder unit 33 which senses the longitudinal displacement of the rack bar 8 which results from a given rotation of the lead screw in accordance with the pitch of that screw. The detector device 27 likewise provides a signal to a third encoder unit 34 and which signal is indicative of any displacement which may result between the carriage 14 and the scale bar 25. The encoder units 32, 33 and 34 each provide signals which are transmitted to and integrated by a computer device 35.

Because of the varying pitch presented by the rack teeth 10, it will be realised that a varying ratio gear will be provided by the driving engagement between the rack and test pinion teeth so that the predetermined and constant successive units of angular or rotational displacement of the pinion 15 will result from varying and respectively successive longitudinal displacements of the rack bar 8 and accordingly the encoder 32 provides an input signal to the computer device 35 for each predetermined unit (say 1° units as aforementioned) while the encoder 33 provides an input signal to the device 35 of the longitudinal displacement imparted to the rack bar 8 to effect in the said angular displacement of the pinion. During the driving engagement of the test pinion with the rack bar it is possible, and likely, that there will be a variation in the meshing centres of the pinion and rack bar (that is in the spacing between the pinion and rack bar axis) and this will result in the pinion carriage 14 being displaced under or against the biasing of the spring component within the housing 20; this displacement is sensed by the movement of the detector 27 relative to the scale 26 so that the encoder 34 provides an input signal to the computer device 35 as an indication in the variation of the aforementioned meshing centres at a particular position of engagement between the rack and pinion teeth. The rack bar 8 under test will likely be randomly selected from a mass produced batch of such rack bars each of which should comply with predetermined or standard characteristics with regard to the formation of its rack teeth and be within a predetermined tolerance range for those characteristics. The variable ratio gear is, of course, an important characteristic which can be determined by the sensings through the encoders 32 and 33; it is also important to determine the characteristics of the meshing engagement between the rack and pinion teeth and an indication of this is provided by the variation which may result from a predetermined spacing provided between the rack bar and test pinion axes under the spring biasing and as sensed by the detector 27. With this in mind the computer device 35 can be pre-programmed with the standard characteristics and permitted tolerance in those characteristics which are required of the rack teeth under test so that the input signals derived from the encoders 32 to 34 can be integrated by the computer device 35 and compared with the required characteristics to provide an output 36 (which may be graphical or otherwise) which is indicative of the acceptability of the rack bar under test.

During a typical testing procedure it is envisaged that the rack bar 8 will be set up so that the test pinion 15 engages with the centre tooth of the rack teeth 10 and with the pinion axis 15 at the required angle with respect to the rack bar axis 9. The threaded rod 19 will then be adjusted to provide the appropriate biasing force as indicated by the scale 21 following which the rack bar would be displaced longitudinally to rotate the pinion one complete turn on either side of the aforementioned centre tooth (to ensure that the programme of the computer device 35 can centralise on the centre tooth). Following this centralisation the rack bar 8 may be displaced so that the pinion 15 engages at one end of the array of rack teeth; with the rack and pinion in this condition the rack bar is displaced to rotate the pinion towards and to the opposite end of the rack and during this latter displacement the output 36 from the computer can be observed to assess the acceptability of the rack teeth 10.

In the embodiment shown in FIG. 1 the clamping blocks 4 and 5 retain the rack bar 8 rigidly within the carriage 3. During practical use of a rack bar, for example in a rack and pinion steering gear of conventional form, there is a tendency for the rack bar to exhibit a rolling motion about its longitudinal axis as a result of the driving engagement from the pinion to the rack teeth. The tendency for the rack bar 8 under test to exhibit this rolling characteristic can be assessed by use of the modification shown in FIG. 2 whereby the rack bar 8 is carried by the rack bar carriage 3 in a rotary thrust bearing 37. The bearing 37 ensures that longitudinal displacement is imparted to the rack bar from the lead screw 30 whilst permitting the rack bar to rotate about its longitudinal axis 9. Accordingly, it is possible to detect the rack roll which may result from the driving engagement between the rack and test pinion. If required, a sensor 38 can be provided which is responsive to rolling or rotary motion of the rack and provide signals to an encoder 39 and therethrough to the computer device 35 (in a similar manner to the detector device 27 and encoder 34) so that this input can be compared by the device 35 with the acceptable standard characteristics required of the rack bar under test.

A further facility which may be provided by the apparatus as above described is for the test pinion 15 to be permitted to swivel relative to the rack bar axis 9 during the longitudinal displacement of the rack bar 8. Although it will be intended that in practice the pinion axis should be maintained at a predetermined angle with respect to the longitudinal axis 9, any deviation from that predetermined angle which results during the driving engagement between the rack and test pinion may serve to provide an indication of the acceptability of the rack bar under test. With this in mind the swivel plate 11 may remain unlocked relative to the base plate 1 during a testing procedure and sensing means 11a can be provided which is responsive to any angular displacement which results between the swivel plate 11 and the base plate 1 (again this sensing means can be similar to the detector device 27) to provide an input signal to an encoder and therethrough to the computer device 35 from which the acceptability of the rack can be further assessed.

Although in FIG. 1 the rack bar 8 is shown as being of cylindrical form, it will be apparent that the support 7 and clamp 4 can be arranged to suit rack bar designs of any cross sectional form such as the conventional T-section or triangular section. Furthermore, and as mentioned above, the provision of the counterweight 24 is optional and if, for example, the weight of the carriage 14 and test pinion 15 is to be alleviated (without use of a counterweight 24) in assessing the spring biasing, then the apparatus may conveniently be orientated so that the pinion axis 16 is located in a vertical plane.

We claim:

1. Apparatus for testing rack teeth of a rack member for a rack and pinion vehicle steering gear, said apparatus comprising a support for mounting the rack member for longitudinal displacement, a helically toothed test pinion member having an axis, a carriage mounting the test pinion member for rotation about its axis and in driving engagement with the rack teeth, biasing means for applying a biasing force urging the test-pinion member into engagement with the rack teeth and for providing a predetermined spacing between the longitudinal axis of the rack member and the axis of the test pinion member, means for adjusting the biasing force of the biasing means at said predetermined spacing, drive means for effecting displacement of one of the rack and test pinion members to impart displacement to the other of the rack and test pinion members, first sensing means for sensing the displacement of one of the rack and test pinion members which results from successive and predetermined unit displacement of the other of the rack and test pinion members, second sensing means for sensing a variation from the predetermined spacing between the axes of the rack and pinion members which is caused by said unit displacements, the first and second sensing means providing respective output signals upon sensing the displacement of one of the rack and test pinion members and the variation from the predetermined spacing between the axes of the rack and test pinion members, respectively, from which output signals characteristics of the rack member under test can be compared with the standard characteristics acceptable for the rack member, the support for mounting the rack member comprising means for supporting the rack member for rolling motion about its longitudinal axis during its driving engagement with the test pinion member.

2. Apparatus as claimed in claim 1 further comprising third sensing means for sensing the rolling motion of the rack member and for providing an output signal in response thereto for comparison with the acceptable standard characteristics.

3. Apparatus as claimed in claim 1 further including means for supporting the carriage and the test pinion member for vertical displacement in response to a variation from said predetermined spacing between the axes of the rack member and the test pinion member, and means for relieving the weight of the carriage and the test pinion member comprising counterbalance means.

4. Apparatus as claimed in claim 1 further including means for adjusting the angle of the axis of the test pinion member with respect to the longitudinal axis of the rack member in mounting the rack member for driving engagement with the test pinion member.

5. Apparatus as claimed in claim 4 further comprising locking means for securing the test pinion member with its axis at a predetermined angle with respect to the longitudinal axis of the rack member.

6. Apparatus as claimed in claim 4 comprising fourth sensing means for sensing any variation in a predetermined angle of the axis of the test pinion member with respect to the longitudinal axis of the rack member caused by said unit displacements and for providing an output signal in response thereto for comparison with the acceptable standard characteristics.

7. Apparatus as claimed in claim 1 in which the drive means displaces the rack member longitudinally, and the test pinion member is rotatably displaced in response to the longitudinal displacement of the rack member.

8. Apparatus as claimed in claim 7 in which the drive means comprises a rotatably driven lead screw, the lead screw longitudinally displacing the support for mounting the rack member.

9. Apparatus as claimed in claim 1 in which the support for mounting the rack member includes means for mounting and displacing the rack member with the rack teeth retained in a predetermined plane with respect to the test pinion member.

10. Apparatus as claimed in claim 1 and comprising a computer device for processing the output signals from the first and second sensing means and for providing an output which is indicative of the characteristics of the rack member under test.

11. Apparatus as claimed in claim 10 in which the computer device is pre-programmed with the standard characteristics acceptable for the rack member under test and provides an output which is indicative of the acceptability of the rack member under test by comparison of the characteristics of that rack member with the predetermined acceptable characteristics.

* * * * *